United States Patent
Mukerji et al.

(10) Patent No.: US 9,788,037 B2
(45) Date of Patent: *Oct. 10, 2017

(54) SYSTEM FOR MANAGING MEDIA CONTENT FOR A PERSONAL TELEVISION CHANNEL

(71) Applicant: AT&T INTELLECTUAL PROPERTY I, LP, Atlanta, GA (US)

(72) Inventors: Ankur Mukerji, Half Moon Bay, CA (US); Charles V. Scott, Austin, TX (US); Scott White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,146

(22) Filed: Nov. 25, 2015

(65) Prior Publication Data

US 2016/0080795 A1    Mar. 17, 2016

Related U.S. Application Data

(63) Continuation of application No. 14/748,957, filed on Jun. 24, 2015, now Pat. No. 9,226,032, which is a
(Continued)

(51) Int. Cl.
*H04N 21/2668* (2011.01)
*H04N 7/173* (2011.01)
(Continued)

(52) U.S. Cl.
CPC ..... *H04N 21/2668* (2013.01); *H04N 7/17318* (2013.01); *H04N 21/2353* (2013.01); *H04N 21/2541* (2013.01); *H04N 21/2665* (2013.01); *H04N 21/4108* (2013.01); *H04N 21/4312* (2013.01); *H04N 21/4532* (2013.01); *H04N 21/4622* (2013.01); *H04N 21/4627* (2013.01); *H04N 21/4756* (2013.01); *H04N 21/4758* (2013.01); *H04N 21/47202* (2013.01);
(Continued)

(58) Field of Classification Search
CPC .................................................. H04N 21/2668
See application file for complete search history.

(56) References Cited

U.S. PATENT DOCUMENTS

| | | | |
|---|---|---|---|
| 5,534,911 A | 7/1996 | Levitan | |
| 6,081,263 A * | 6/2000 | LeGall | G06F 9/4443 348/E5.105 |

(Continued)

*Primary Examiner* — Nathan Flynn
*Assistant Examiner* — Alexander Q Huerta
(74) *Attorney, Agent, or Firm* — Guntin & Gust, PLC; Jay H. Anderson

(57) ABSTRACT

A system for presenting media programming guides is disclosed. A system that incorporates teachings of the present disclosure may include, for example, a media processor can have a controller to transmit to a media source a request to access media content of a personal television (TV) channel composed by a subscriber of a media communication system according to one or more graphical user interface (GUI) templates that define a plurality of segments of a presentation area of the personal TV channel and one or more modules that arrange media content of the subscriber in the plurality of segments of a select one of the plurality of GUI templates. Other embodiments are disclosed.

19 Claims, 9 Drawing Sheets

Related U.S. Application Data continuation of application No. 14/264,639, filed on Apr. 29, 2014, now Pat. No. 9,094,704, which is a continuation of application No. 11/972,484, filed on Jan. 10, 2008, now Pat. No. 8,752,110.

(51) Int. Cl.

| | | |
|---|---|---|
| *H04N 21/2665* | (2011.01) | |
| *H04N 21/462* | (2011.01) | |
| *H04N 21/482* | (2011.01) | |
| *H04N 21/235* | (2011.01) | |
| *H04N 21/41* | (2011.01) | |
| *H04N 21/472* | (2011.01) | |
| *H04N 21/475* | (2011.01) | |
| *H04N 21/431* | (2011.01) | |
| *H04N 21/485* | (2011.01) | |
| *H04N 21/254* | (2011.01) | |
| *H04N 21/45* | (2011.01) | |
| *H04N 21/4627* | (2011.01) | |

(52) U.S. Cl.
CPC ..... *H04N 21/4821* (2013.01); *H04N 21/4825* (2013.01); *H04N 21/4858* (2013.01)

(56) References Cited

U.S. PATENT DOCUMENTS

| | | | |
|---|---|---|---|
| 6,249,320 B1 * | 6/2001 | Schneidewend | H04B 7/18526 348/569 |
| 6,601,237 B1 | 7/2003 | Ten Kate et al. | |
| 6,774,926 B1 * | 8/2004 | Ellis | H04N 5/44543 348/14.01 |
| 7,010,492 B1 | 3/2006 | Bassett | |
| 7,103,905 B2 * | 9/2006 | Novak | H04N 7/17318 348/E7.071 |
| 7,146,627 B1 | 12/2006 | Ismail et al. | |
| 7,539,696 B1 * | 5/2009 | Greener | G06Q 30/02 |
| 8,793,718 B2 * | 7/2014 | White | H04N 21/2221 725/24 |
| 8,918,825 B2 | 12/2014 | Mukerji | |
| 9,094,704 B2 | 7/2015 | Mukerji | |
| 2002/0053077 A1 * | 5/2002 | Shah-Nazaroff | H04H 60/33 725/13 |
| 2002/0056119 A1 | 5/2002 | Moynihan | |
| 2002/0104098 A1 | 8/2002 | Zustak et al. | |
| 2002/0144267 A1 | 10/2002 | Gutta et al. | |
| 2002/0147977 A1 | 10/2002 | Hammett | |
| 2003/0028893 A1 | 2/2003 | Addington | |
| 2003/0115585 A1 | 6/2003 | Barsness | |
| 2004/0117822 A1 * | 6/2004 | Karaoguz | H04H 20/106 725/37 |
| 2004/0128183 A1 * | 7/2004 | Challey | G06Q 30/0203 705/7.32 |
| 2004/0163127 A1 * | 8/2004 | Karaoguz | H04L 67/327 725/120 |
| 2005/0047752 A1 * | 3/2005 | Wood | G11B 27/34 386/296 |
| 2005/0108770 A1 | 5/2005 | Karaoguz et al. | |
| 2005/0210502 A1 | 9/2005 | Flickinger | |
| 2006/0020974 A1 | 1/2006 | Birnbaum et al. | |
| 2006/0123455 A1 * | 6/2006 | Pai | H04N 7/17318 725/133 |
| 2007/0079325 A1 * | 4/2007 | de Heer | H04N 7/17318 725/32 |
| 2007/0199019 A1 | 8/2007 | Angiolillo | |
| 2007/0214473 A1 * | 9/2007 | Barton | G11B 27/105 725/28 |
| 2007/0288978 A1 * | 12/2007 | Pizzurro | H04N 21/64322 725/112 |
| 2007/0299976 A1 * | 12/2007 | Zafar | H04L 61/1582 709/229 |
| 2008/0046099 A1 | 2/2008 | Belmont et al. | |
| 2008/0222689 A1 | 9/2008 | Howcroft et al. | |
| 2009/0094286 A1 * | 4/2009 | Lee | G06Q 30/02 |
| 2009/0183213 A1 | 7/2009 | Mukerji et al. | |
| 2013/0227615 A1 * | 8/2013 | Bryant | H04N 5/44543 725/58 |
| 2014/0068651 A1 * | 3/2014 | Cronin | H04H 60/33 725/24 |

* cited by examiner

100

300

SYSTEM FOR MANAGING MEDIA CONTENT FOR A PERSONAL TELEVISION CHANNEL

CROSS-REFERENCE TO RELATED APPLICATIONS

This application is a continuation of U.S. patent application Ser. No. 14/748,957, filed Jun. 24, 2015, which is a continuation of U.S. patent application Ser. No. 14/264,639, filed Apr. 29, 2014 (now U.S. Pat. No. 9,094,704), which is a continuation of U.S. patent application Ser. No. 11/972,484, filed Jan. 10, 2008 (now U.S. Pat. No. 8,752,110), which are incorporated herein by reference in their entirety.

FIELD OF THE DISCLOSURE

The present disclosure relates generally to media content presentation techniques and more specifically to a system for managing media content for a personal television (TV) channel.

BACKGROUND

Social networking has become very popular on the Internet. Common socialization techniques include blogging, and posting personal information on social networks such as YouTube.com™, MySpace.com™ and Facebook.com™. Social networking can also be extended to media communication systems such Internet Protocol television (IPTV), cable TV, or satellite TV capable of providing broadcast and peer-to-peer personal TV channels.

DETAILED DESCRIPTION

In one embodiment of the present disclosure, a computer-readable storage medium can have computer instructions for presenting a plurality of graphical user interface (GUI) templates for defining a plurality of segments of a viewable presentation area of a personal television (TV) channel procured by a subscriber from a service provider of a media communication system, presenting a plurality of modules for arranging media content of the subscriber in the plurality of segments of a select one of the plurality of GUI templates, receiving from the subscriber one or more selections of the plurality of GUI templates, arranging one or more portions of the media content of the subscriber in the plurality of segments of the one or more selected GUI templates according to one or more selections of the plurality of modules and one or more directives supplied to the selected one or more modules by the subscriber, receiving a request for access to the personal TV channel from a requesting device, and presenting portions of media content in the personal TV channel according to the selected one or more GUI templates and the directives supplied to the selected one or more modules.

In another embodiment of the present disclosure, a media processor can have a controller to transmit to a media source a request to access media content of a personal TV channel composed by a subscriber of a media communication system according to one or more GUI templates that define a plurality of segments of a presentation area of the personal TV channel and one or more modules that arrange media content of the subscriber in the plurality of segments of a select one of the plurality of GUI templates.

In yet another embodiment of the present disclosure, a portal can have a controller to present a subscriber of a media communication system one or more selectable GUI templates, and to present the subscriber one or more modules for composing media content in a personal TV channel.

In another embodiment of the present disclosure, a method can involve presenting a subscriber of a media communication system at least one among one or more selectable GUI templates and one or more modules for composing media content in a personal TV channel.

Figure 1:
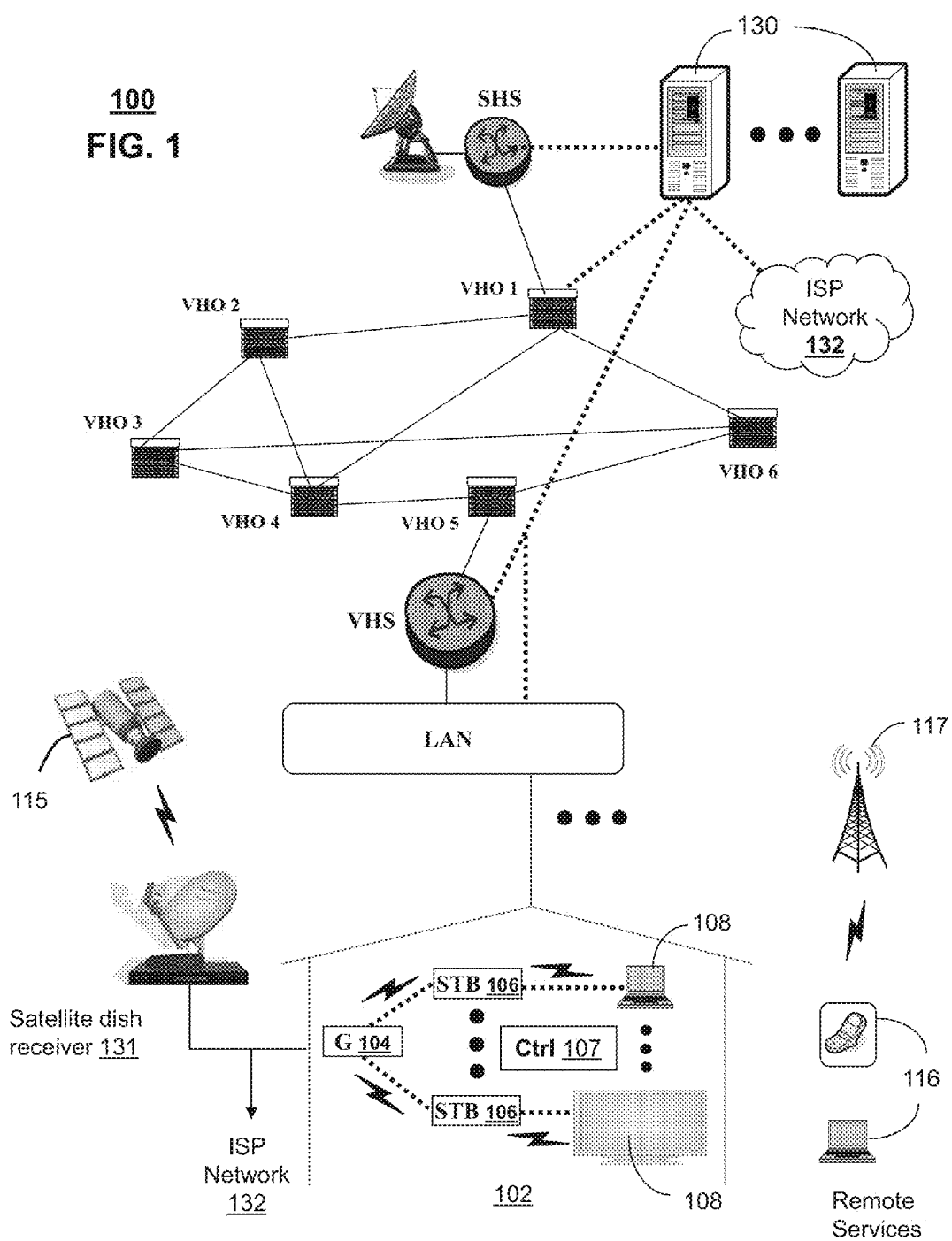
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a personal television (TV) system (herein referred to as personal TV system 130) for purchasing and constructing personal TV channels purchased by subscribers for distributing media content of the subscriber.

In another illustrative embodiment, the media processor 106 of a subscriber of the first communication system 100 can be used as a media source for broadcasting media content in a personal TV channel. The personal TV system 130 can provide personal TV services to subscribers who for example cannot afford a media processor 106 capable of providing such personal TV channel services.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
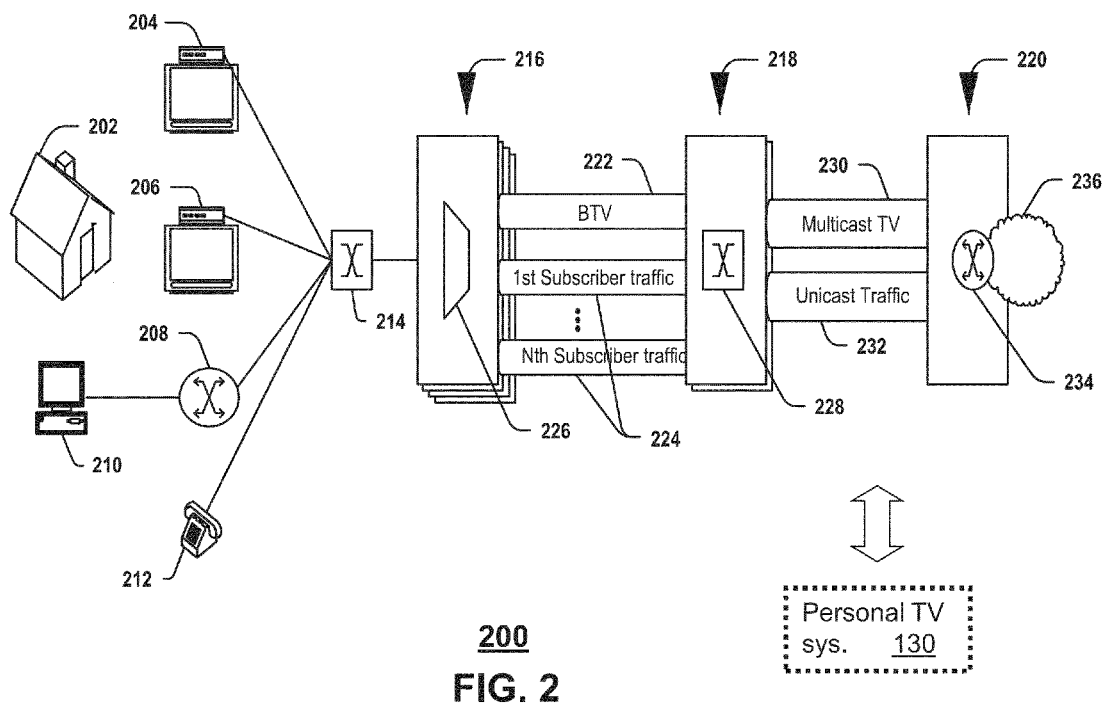

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The personal TV system 130 of FIG. 1 can be operably coupled to the second communication system 200 for purposes of broadcasting media content supplied by subscribers in a personal TV channel of the second communication system. In another illustrative embodiment, the STBs 204, 206 of the second communication system 200 can be used as a media source for broadcasting media content in the personal TV channel of the subscriber.

Figure 3:
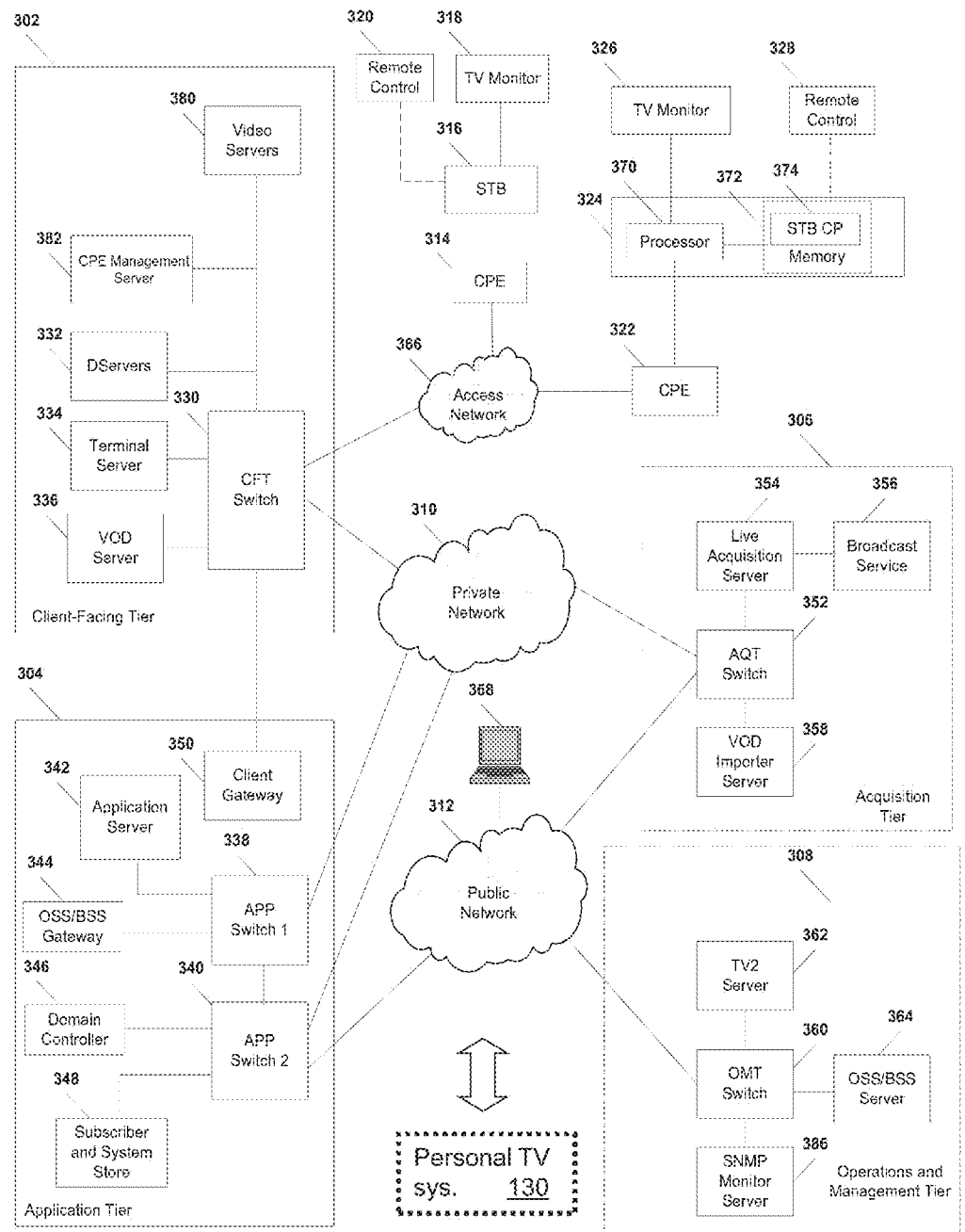

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The personal TV system 130 of FIGS. 1-2 can be operably coupled to the third communication system 300 for purposes of broadcasting media content supplied by subscribers in a personal TV channel of the second communication system. In another illustrative embodiment, the STBs 316, 324 of the third communication system 300 can be used as a media source for broadcasting media content in the personal TV channel of the subscriber.

It should be apparent to one of ordinary skill in the art from the foregoing media system embodiments that other suitable media systems for distributing broadcast media content as well as peer-to-peer exchange of content in personal TV channels can be applied to the present disclosure.

Figure 4:
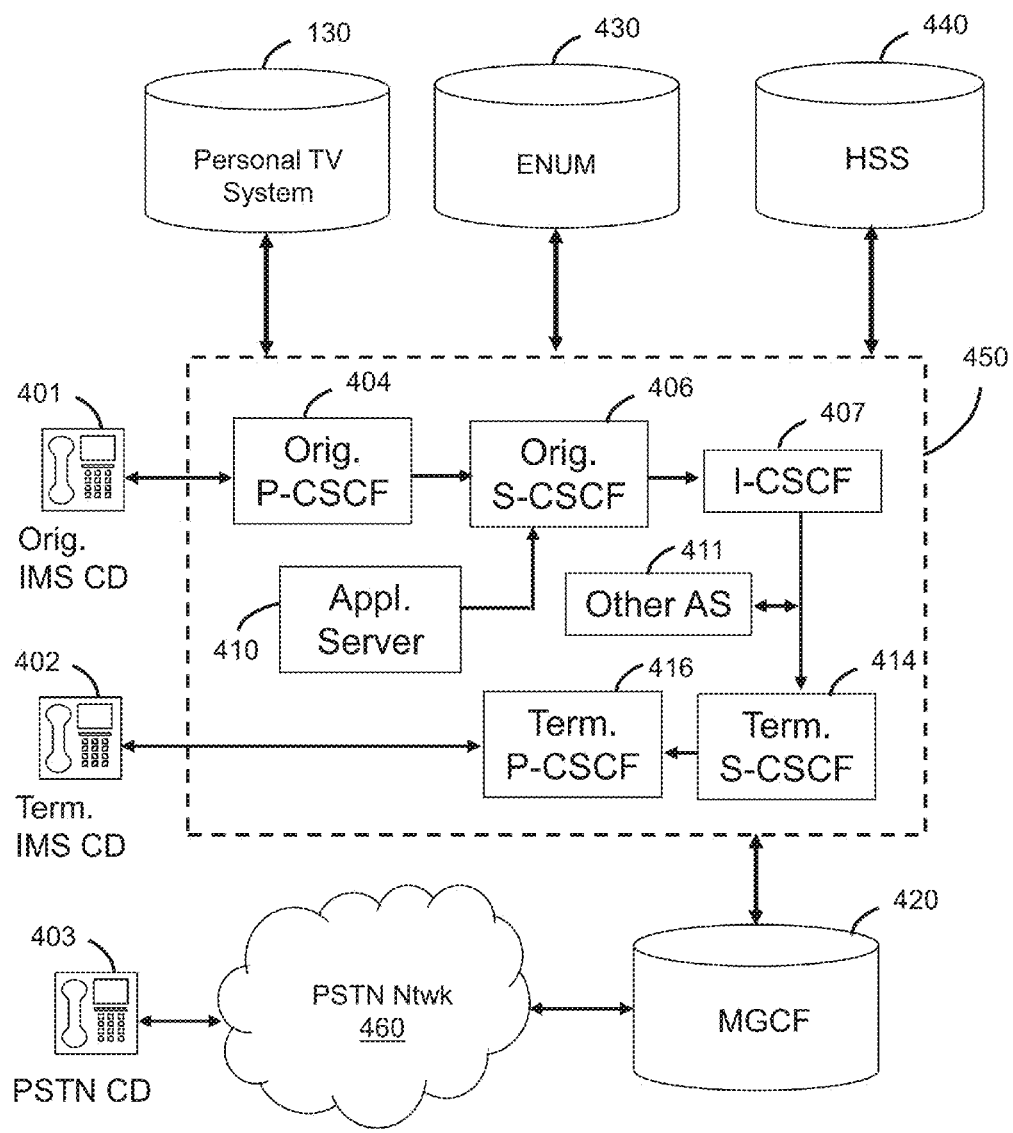

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the personal TV system 130 previously discussed for FIGS. 1-3. In this representative embodiment, the personal TV system 130 can be accessed over a PSTN or VoIP channel of communication system 400 by common techniques such as described above.

Figure 5:
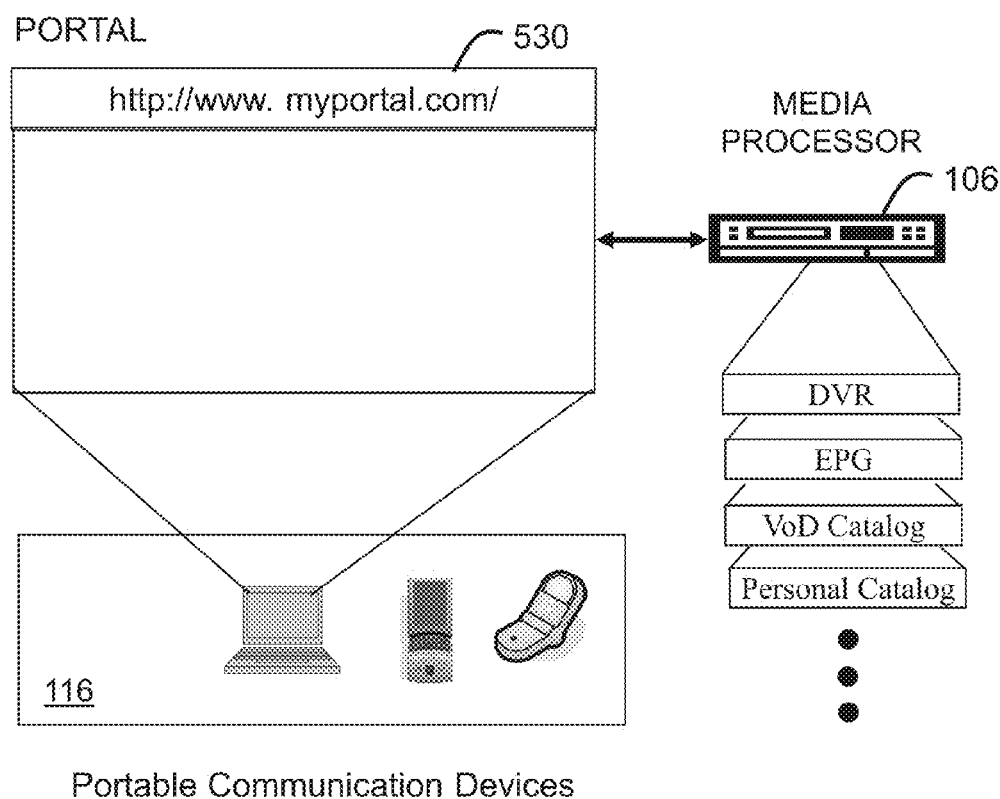
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), personal TV channels, and so on. The portal 530 can also be an integral subsystem of the personal TV system 130.

A personal TV channel should not be confused with a common broadcast channel sourced by commercial and non-profit enterprises such as NBC (National Broadcasting Company), CBS (Columbia Broadcasting System), ABC (American Broadcasting Channel), PBS (Public Broadcasting System), ESPN (Entertainment and Sports Programming Network), HBO (Home Box Office), Disney Channel, Nickelodeon, and so on. Commercial and non-profit broadcast channels present media content managed in part by media supplier corporations such as, for example, General Electric, Walt Disney Company, and conglomerates such as Time Warner.

Commercial and non-profit media suppliers are generally speaking not subscribers or consumers of the media content presented by the abovementioned media communication systems. Service providers of the abovementioned media communication systems serve as distributors to commercial and non-profit media suppliers and generally present their media content on select channels which are commonly known and memorized by its subscribers because of their frequency of use. Subscribers of the abovementioned media communication systems consume the media content presented on these broadcast channels and are not offered an opportunity to intermix personal content with the content of the commercial and non-profit broadcast media suppliers.

Personal TV channels, on the other hand, provide subscribers of the abovementioned media communication systems a unique opportunity to broadcast media content managed by the subscribers. The source of media content presented by the subscriber can be of any form (e.g., audio, video, still pictures, text, and combinations thereof). The presentation timing of the media content broadcasted by the subscriber in personal TV channels can be determined at the subscriber's discretion. Similarly the subscriber has the discretion to choose any media content the subscriber desires to present in the personal TV channel. Personal TV channels can be selected and consumed by subscribers of the media communication systems as well as others having access to the media communication systems by entering a channel number or other form of identification assigned by the service providers of the media communication systems to each personal TV channel.

Figure 6:
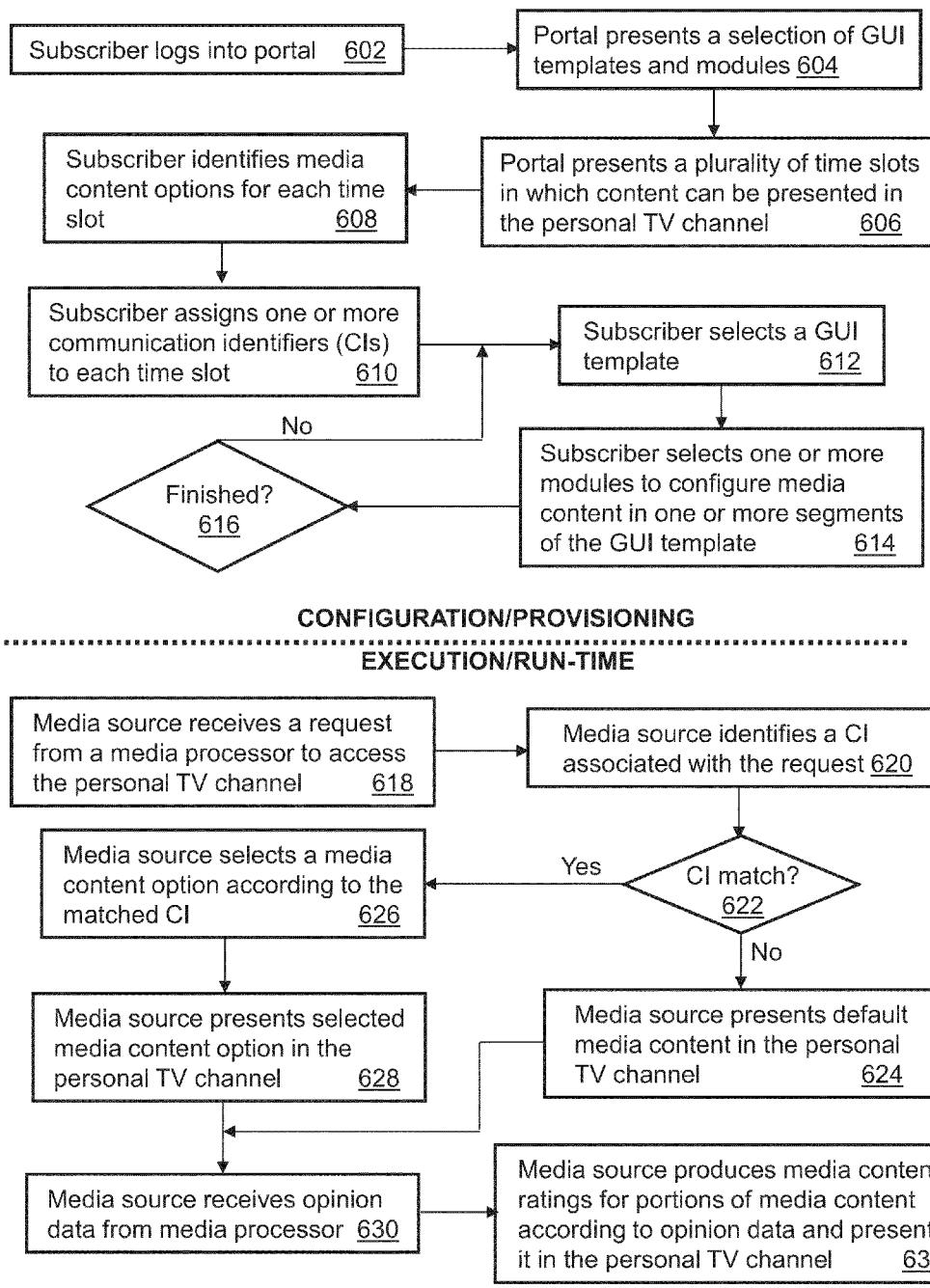
FIG. 6 depicts an exemplary method operating in portions of the communication systems of FIGS. 1-4.

With the aforementioned embodiments in mind, FIG. 6 depicts an exemplary method 600 operating in portions of the media communication systems 100-500. Method 600 begins with step 602 in which a subscriber logs into the portal 530 by common means (e.g., user name and password). To manage content on the personal TV channel, the portal 530 can be directed to present in step 604 a selection of graphical user interface (GUI) templates and modules such as shown in FIGS. 7-8 that can be used to manage the presentation of media content owned and/or controlled by the subscriber in segments of a select GUI template.

Figure 7:
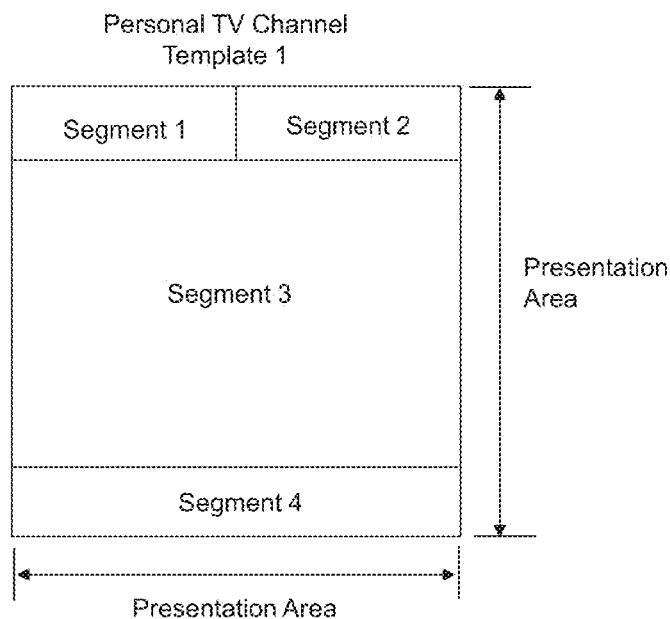
FIGS. 7-9 depict exemplary illustrations of graphical user interface (GUI) templates and modules used by the method of FIG. 6.
Figure 7:
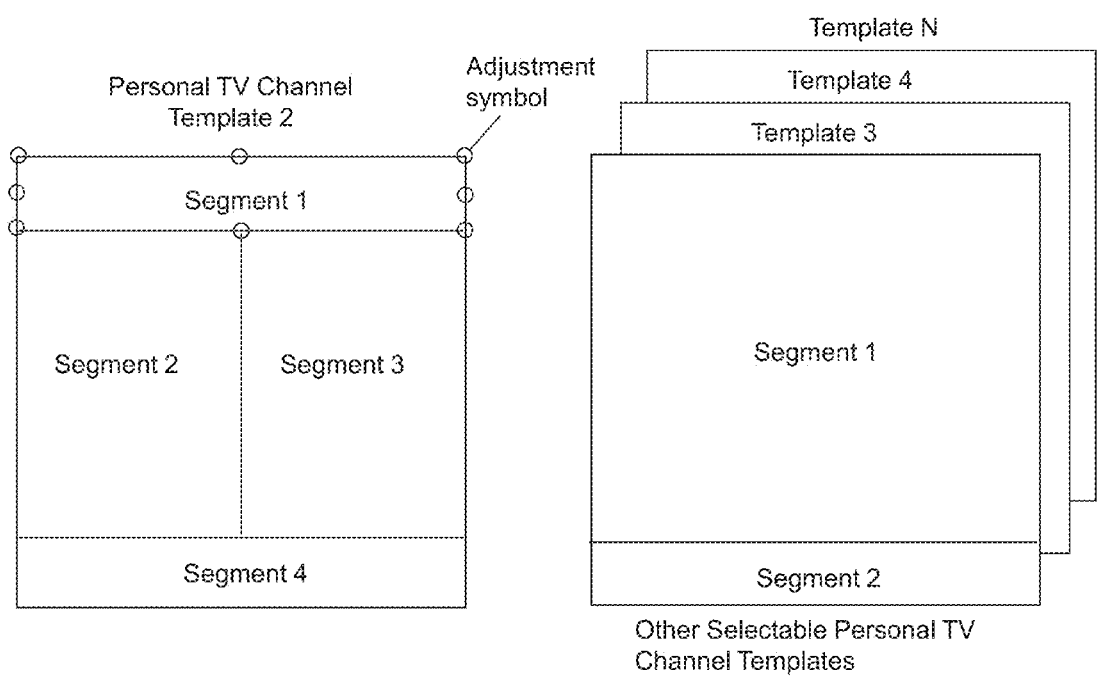
Figure 8:
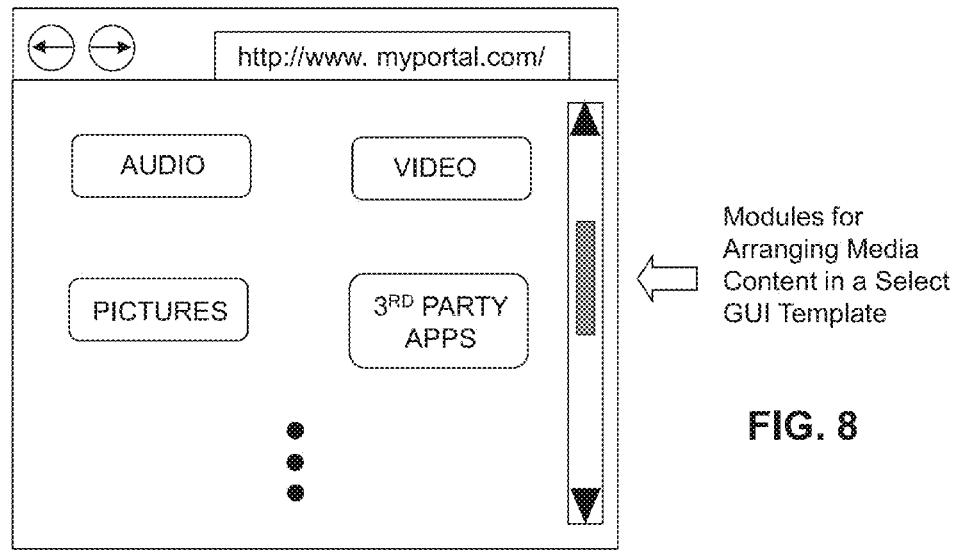

As depicted in FIG. 7 the subscriber can be presented with an assortment of GUI templates to choose from. GUI template 1 for example segments a two dimensional presentation area or canvas of the personal TV channel into four segments. Each segment can carry any form of independent media content selected by the subscriber. For example, the subscriber can choose to place in segment 1 a live feed from a web cam operated by the subscriber to provide feedback to viewers of the personal TV channel. Segment 2 can carry a sports commentary supplied by the subscriber in an instant messaging message. Segment 3 can carry a live feed of a sports program being viewed by the subscriber (e.g., ESPN program) or a DVR recording of the same. Segment 4 can carry a horizontal scroll bar of sports scores of a particular team sport (e.g., football) collected and published by the subscriber. Templates 2-N can provide other forms of segmentation of the presentation area of the personal TV channel.

The portal 530 can provide the subscriber a means to browse through each template until the subscriber has found a desirable template. The portal 530 can also provide the subscriber a means to define a custom template if none of the predefined GUI templates are desirable. A custom GUI template can be defined by for example selecting an existing template or a new template.

When an existing template is selected, the subscriber can redefine the size and location of the segments. A segment can be relocated by selecting with a computer mouse the segment and dragging it to another location in the presentation area of the personal TV channel. When a segment is moved the other segments can be resized by the portal 530 automatically to accommodate the new location of the segment. To resize and/or reshape a segment (such as segment 1 of template 2 in FIG. 7), the subscriber can select the segment with a mouse pointer to highlight six adjustment symbols in the segment (middle sides and corners), and then select an adjustment symbol to resize it. A segment can be resized from the corners or sides as is typically performed with common drawing tools (e.g., Microsoft Power-PointTM) The subscriber can also delete segments by selecting a segment and for example right clicking a mouse button and selecting a delete option or selecting a delete button provided by the portal 530. When a new template is chosen, the portal 530 can provide an empty canvas from which the subscriber can add segments by selecting an add segment button provided by the portal, and can reshape and relocate segments as described above.

To populate segments of a GUI template with media content of the subscriber, the portal 530 can present a selection of modules such as shown in FIG. 8. The modules can represent without limitation an audio module for arranging an audio content presentation in the personal TV channel, a moving image module for arranging a moving image content presentation in the personal TV channel, a still image module for arranging a still image presentation in the personal TV channel, or third party modules for arranging content from third party sources. Modules can work collectively to produce hybrid media content results (e.g., mixing audio and video). A module in the present context can represent a software application operating in the portal 530 which can be utilized by subscribers to manage content in the personal TV channel. The software application can represent a software development kit (SDK) which in whole or in part operates in the portal 530 and/or media devices of the subscriber (e.g., STB, DVR, PDA, cell phone, etc.) interfacing to the portal 530.

For example, when a subscriber selects a video module, the portal 530 can present a web page with fields that can be populated by the subscriber and in some instances fields with a drop-down menu. For instance, the portal 530 can prompt the subscriber to identify a device or devices from which media content will be supplied (e.g., DVR, STB, PDA, cell phone, etc.). If the device is not recognized by the portal 530, the subscriber can be prompted by the portal to provide communication data. Communication data can be represented by authentication data (login information, PIN, password) supplied by the subscriber, and/or a communication identifier of the device (e.g., IP address, domain name, SIP URI, etc.). In situations where the portal 530 is familiar with the media devices of the subscriber, the portal can provide a drop-down menu of the subscriber's devices. The portal 530 can become familiar with the subscribers devices from prior setup interactions, and/or preexisting knowledge of communication data of the devices the service provider has supplied to the subscriber to consume the services of the media communication system.

Once the device is identified, the portal 530 can establish communications with the media device in question by way of the network elements of the media communications system, and thereby locate the media content available on said device. The portal 530 can then present the subscriber the media content as it is organized in the media device (directories, folders, etc.). The portal 530 can also provide the subscriber a common content editor to edit selections of media content. The editor can for example redact portions of media content, combine media content types (audio and video), increase speed of presentation to minimize presentation time, resolution of presentation, quality of service setting, and so on. The subscriber can choose not to use the editor when the content is a live feed or the subscriber desires to maintain the original format of the content.

Once the subscriber has prepared the media content as desired, the portal 530 can present the subscriber in step 606 one or more selectable time slots for assigning portions of the subscriber's content. The time slots can be defined with a recurrence schedule (e.g., content presented from 8-9 pm every Wednesday for 3 weeks). In step 608 the subscriber can also identify media content options for each time slot. Each media content option can provide a different media experience based on the viewer's identity. To make this distinction, each media content option can be associated with one or more distinct communication identifiers. With this association the subscriber can present a media content option for parents, another media content option for siblings, another media content option for friends, and yet another media content option for unrecognized viewers, each media content option indexed by the communication identifier supplied by each viewer requesting access to the personal TV channel.

Figure 9:
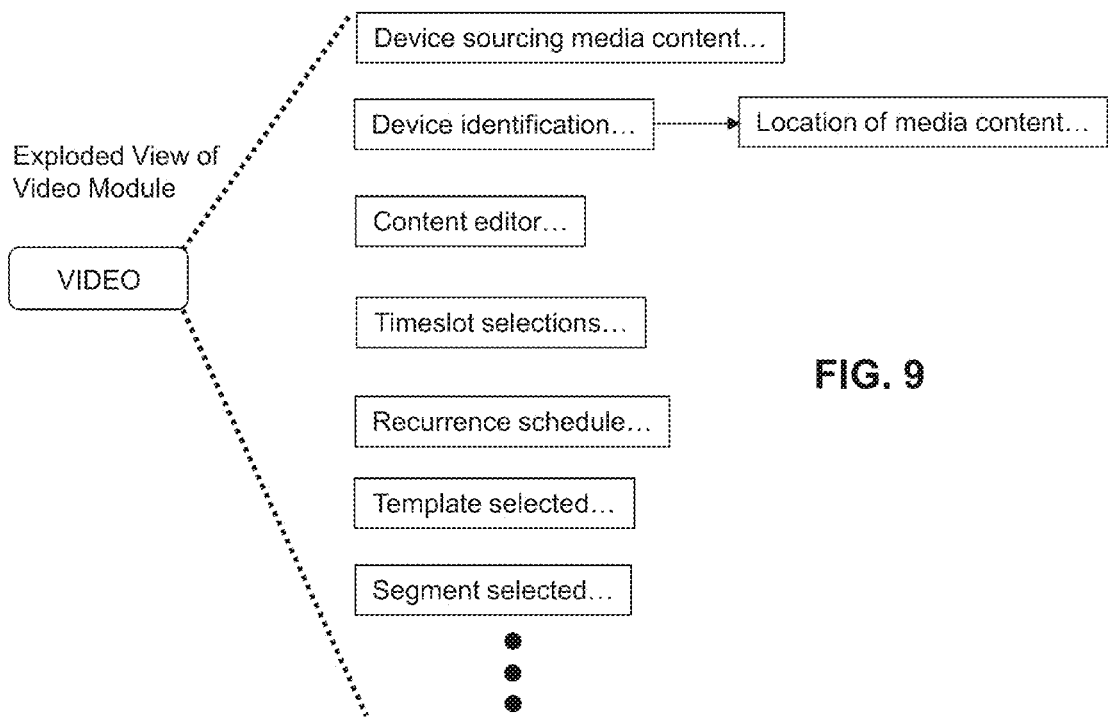

Once media content options have been associated with a select time slot and corresponding communication identifiers, the subscriber can select in step 612 a GUI template for each media content option to provide a varied viewing experience for the population of users assigned to each media content option. For example, the subscriber can choose template 1 to present media content to the subscriber's parents, template 2 for siblings, template 3 for friends and family, and template 4 for all others. It should be noted that although the subscriber has the option to assign a different GUI template to each media content option, the subscriber can instead choose to use the same template across more than one media option. In step 614, the subscriber can select one or more modules to arrange media content in each GUI template of a select media content option as described earlier in FIGS. 8-9. Steps 612-614 can be repeated until all media content options have been assembled according to a select GUI template and corresponding modules.

Steps 602-616 can collectively represent a configuration or provisioning phase performed by the subscriber(s) which can be performed independently of the execution or run-time steps 618-632 which illustrate the personal TV channel in use. This dichotomy is illustrated by the dashed line in FIG. 6.

With this in mind, a media source (e.g., STB or personal TV system 130) managing one or more personal TV channels of one or more corresponding subscribers can be directed in step 618 to process requests for access to personal TV channels of the subscribers. The requests can be initiated by STBs in the same media communication system from which the personal TV channels operate, or from STBs in other networks. In the latter case, service operators of independently operated media communication systems can link their networks together under an intra-service agreement to expand the reach of their respective subscribers. The requests submitted by the requesting devices can each identify the requested personal TV channel according to a variety of channel identification methods as described earlier.

In step 620, the media source can identify a communication identifier associated with each request. In one illustrative embodiment, the media source can submit a request to the requesting device (e.g., an STB) for the communication identifier. The request submitted by the media source can trigger a GUI prompt that the requesting device presents to its user. The GUI prompt can be a form with fields for a user name and password, PIN, or otherwise, which the user of the requesting device can complete. In another illustrative embodiment the requesting device can proactively submit the communication identifier to the media source. In yet another illustrative embodiment the communication identifier can be the combination of authentication data and identifying information of the requesting device (e.g., its MAC address).

Once the media source identifies the communication identifier in step 620, it proceeds to step 622 where it compares it to the communication identifiers assigned to each media content option for the time slot active at the time the request was made. If no match is found, the media source can default to a media content option for unrecognized communication identifiers and present in step 624 media content associated with this option in the personal TV channel. If a match is found, the media source proceeds to step 626 where it selects the media content option associated with the matched communication identifier and presents in step 628 content corresponding to said option in the personal TV channel.

To illustrate these embodiments, suppose that a subscriber of a personal TV channel has configured a time slot from 8-9 pm with three possible media content options: 1) vacation movies, 2) audio recordings of the subscriber, and 3) an MP3 play list of songs from the subscriber's music library. Further assume that the subscriber associates vacation movies with communication identifiers of the subscriber's parents and siblings, audio recordings with the communication identifiers of friends, and the MP3 play list with unidentified communication identifiers. Suppose further that the subscriber's parents, friends and unrecognized parties request access to the subscriber's personal TV channel at the same time.

Under these circumstances the requesting devices (e.g., STBs) of the subscriber's parents and siblings will receive in step 628 multicast signals from the media source for viewing streamed vacation movies of the subscriber in the personal TV channel. The requesting devices of the subscriber's friends will contemporaneously receive in step 628 a different set of multicast signals from the media source for listening to streamed audio recordings of the subscriber on the personal TV channel. Lastly, all other parties who submit unrecognized communication identifiers will receive at their requesting devices in step 624 another set of multicast signals corresponding to streamed MP3 music of the subscriber.

In another illustrative embodiment, the media source in step 630 can receive and process opinion data supplied by the requesting devices as directed by its users. The opinion data can be generated by consumers of media content presented in the personal TV channel proactively or on demand. Consumers can prompt or be prompted by their respective media processors to complete a survey about the media content they have experienced in the personal TV channel. The prompt can be programmed into the media processor as a standard opinion survey form that can be completed by the consumer and submitted to the subscriber of the personal TV channel. The subscriber of the personal TV channel can produce its own survey form which it can submit to consumers along with the media content presented in the personal TV channel. In yet another illustrative embodiment, the service provider of the media communication system can provide its own survey to consumers to standardize the opinion data collected.

The media source can be directed in step 632 to produce media content ratings according to the opinion data supplied. In subsequent presentations of the media content, a media content rating can be supplied as metadata in the personal TV channel which can be processed by requesting devices. The requesting devices can be programmed by its users to apply parental controls to limit access to the media content according to its rating. The rating system used can be standardized ubiquitously by the service provider of the media communication system by defining standard criteria for the survey with some flexibility for the subscribers of the personal TV channels to add their own criteria.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that there are no media content options or communication identifiers to distinguish between viewing communities. In this illustrative embodiment, media content can be organized for the personal TV channel utilizing a select GUI template and corresponding modules for arranging content in segments of the selected GUI template. Thus all viewers requesting access to the personal TV channel would experience the same presentation of the subscriber's content as defined by selected GUI template and modules.

Other suitable modifications can be applied to the present disclosure without departing from the scope of the claims below. Accordingly, the reader is directed to the claims section for a fuller understanding of the breadth and scope of the present disclosure.

Figure 10:
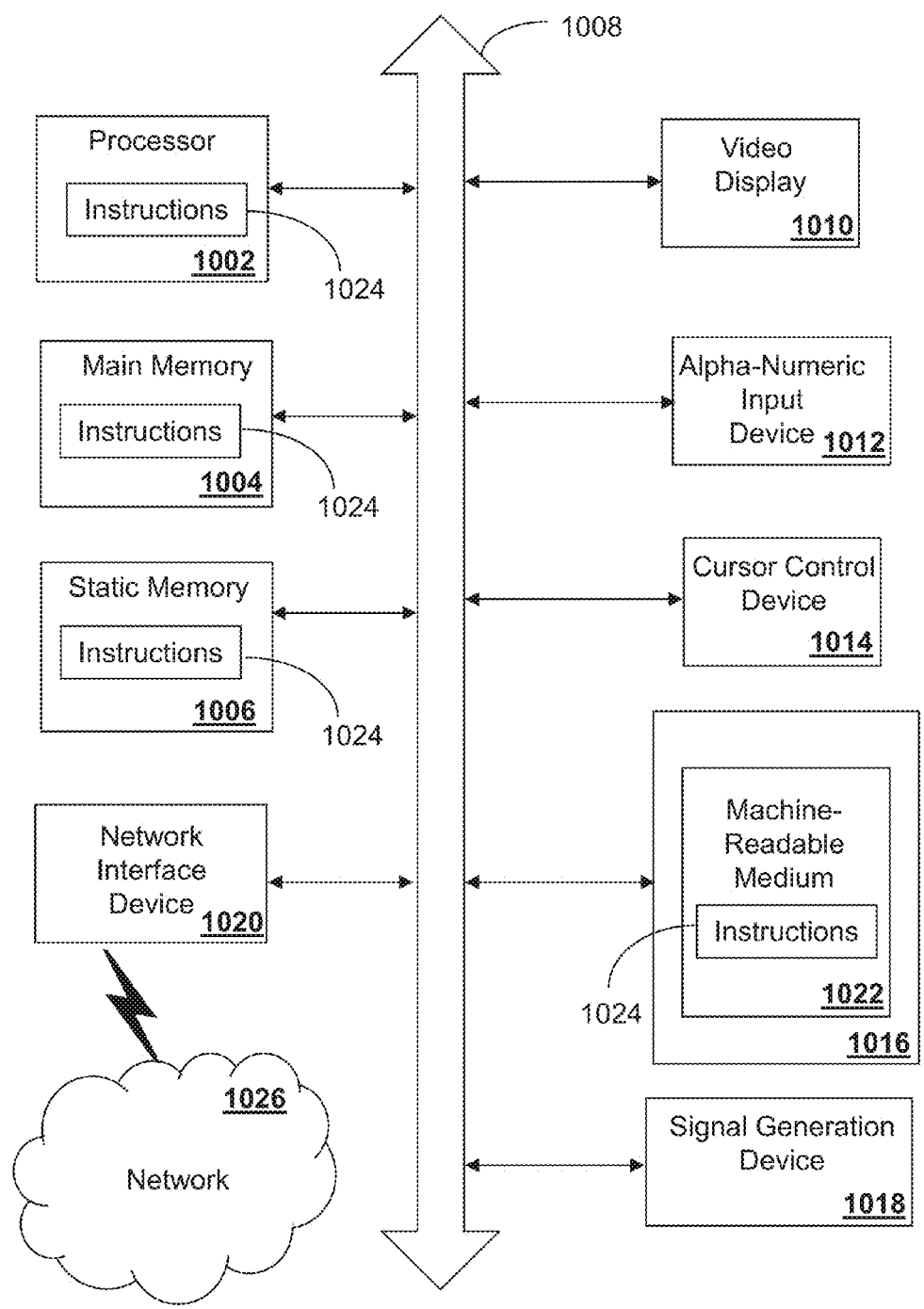
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations comprising:
receiving a request for access to a personal media channel from equipment of a first subscriber of a media communication system;
recognizing a communication identifier associated with the request by determining that the communication identifier is assigned to a media content option for a time slot during which the request is received;
presenting media content corresponding to the media content option for the recognized communication identifier, wherein the media content is presented to the equipment of the first subscriber via the personal media channel during the time slot;
receiving opinion data from the equipment of the first subscriber, wherein the opinion data is related to the media content;
generating a rating for the media content according to the opinion data, using criteria defined by a second subscriber of the media communication system; and
presenting the rating as metadata in a subsequent presentation of the media content, wherein the personal media channel is configured by the second subscriber of the media communication system, and wherein the time slot is configured by the second subscriber with a plurality of media content options corresponding to a plurality of different multicast signals.

2. The device of claim 1, wherein the operations further comprise presenting a survey via the personal media channel.

3. The device of claim 2, wherein presenting the media content further comprises providing a prompt regarding the survey.

4. The device of claim 2, wherein the opinion data comprises responses to the survey.

5. The device of claim 2, wherein the operations further comprise producing a survey form and presenting the survey form to the equipment of the first subscriber.

6. The device of claim 1, wherein the opinion data comprises a survey generated at equipment of the second subscriber.

7. The device of claim 1, wherein configuring the personal media channel comprises arranging the media content in a graphical user interface (GUI) template.

8. The device of claim 1, wherein receiving the request further comprises receiving requests from a plurality of requesting parties associated with different communication identifiers.

9. The device of claim 8, wherein the operations further comprise presenting default media content to equipment of a requesting party that has an associated communication identifier that is not recognized.

10. The device of claim 8, wherein presenting the media content further comprises presenting different media content to the respective requesting parties.

11. The device of claim 1, wherein access to the media content by the equipment of the first subscriber is limited according to the rating.

12. A method comprising:
receiving, by a processing system including a processor, a request for access to a personal media channel from equipment of a first subscriber of a media communication system, wherein the personal media channel is configured by a second subscriber of the media communication system;
recognizing, by the processing system, a communication identifier associated with the request by determining that the communication identifier is assigned to a media content option for a time slot during which the request is received;
presenting, by the processing system, media content corresponding to the media content option for the recognized communication identifier, wherein the media content is presented to the equipment of the first subscriber via the personal media channel during the time slot;
presenting, by the processing system, a survey via the personal media channel;
receiving, by the processing system, opinion data from the equipment of the first subscriber, wherein the opinion data is related to the media content, and wherein the opinion data comprises responses to the survey;

generating, by the processing system, a rating for the media content according to the opinion data, using criteria for the survey defined by the second subscriber of the media communication system; and presenting, by the processing system, the rating as metadata in a subsequent presentation of the media content, wherein the personal media channel is configured by the second subscriber of the media communication system, and wherein the time slot is configured by the second subscriber with a plurality of media content options corresponding to a plurality of different multicast signals.

13. The method of claim 12, wherein the survey is generated at equipment of the second subscriber.

14. The method of claim 12, further comprising generating, by the processing system, a survey form for presentation to the equipment of the first subscriber.

15. The method of claim 12, wherein access to the media content by the equipment of the first subscriber is limited according to the rating.

16. A non-transitory machine-readable storage medium comprising executable instructions that, when executed by a processing system including a processor, facilitate performance of operations comprising:

receiving a request for access to a personal media channel from equipment of a first subscriber of a media communication system;

recognizing a communication identifier associated with the request by determining that the communication identifier is assigned to a media content option for a time slot during which the request is received;

presenting media content corresponding to the media content option for the recognized communication identifier, wherein the media content is presented to the equipment of the first subscriber via the personal media channel during the time slot;

presenting a survey via the personal media channel;

receiving opinion data from the equipment of the first subscriber, wherein the opinion data is related to the media content, and wherein the opinion data comprises responses to the survey;

generating a rating for the media content according to the opinion data, using criteria for the survey defined by a second subscriber of the media communication system; and presenting the rating as metadata in a subsequent presentation of the media content, wherein the personal media channel is configured by the second subscriber of the media communication system, and wherein the time slot is configured by the second subscriber with a plurality of media content options corresponding to a plurality of different multicast signals.

17. The non-transitory machine-readable storage medium of claim 16, wherein receiving the request further comprises receiving requests from a plurality of requesting parties associated with different communication identifiers.

18. The non-transitory machine-readable storage medium of claim 16, wherein the operations further comprise generating a survey form for presentation to the equipment of the first subscriber.

19. The non-transitory machine-readable storage medium of claim 16, wherein the survey is generated at equipment of the second subscriber.

* * * * *